(12) United States Patent
Norder et al.

(10) Patent No.: US 8,028,384 B2
(45) Date of Patent: Oct. 4, 2011

(54) MULTI PIECE BURIAL VAULT BASE AND METHOD OF MAKING THE SAME

(75) Inventors: Phillip Norder, Homewood, IL (US); David Becker, Geneva, IL (US); Gabor Gondocs, Winchester, IL (US); Mike Pazar, Villa Park, IL (US)

(73) Assignee: Wilbert Funeral Services Inc., Broadview, IL (US)

( * ) Notice: Subject to any disclaimer, the term of this patent is extended or adjusted under 35 U.S.C. 154(b) by 199 days.

(21) Appl. No.: 12/411,074

(22) Filed: Mar. 25, 2009
(Under 37 CFR 1.47)

(65) Prior Publication Data
US 2010/0242379 A1    Sep. 30, 2010

(51) Int. Cl.
*A61G 17/00* (2006.01)
(52) U.S. Cl. ................. 27/35; 52/139; 52/140; 403/403
(58) Field of Classification Search .............. 52/136, 52/137, 139, 140, 741.11, 741.12, 468, 459; 27/26–30, 35; 403/403, 293, 295
See application file for complete search history.

(56) References Cited

U.S. PATENT DOCUMENTS

| | | | |
|---|---|---|---|
| 883,492 A | 3/1908 | Searle | |
| 1,393,485 A | 10/1921 | Barber | |
| 1,484,896 A | 2/1924 | Mannix | |
| 1,920,101 A | 7/1933 | Nagel | |
| 1,943,094 A | 1/1934 | Smysor | |
| 2,162,137 A | 6/1939 | Torricelli | |
| 2,484,707 A | 10/1949 | Haase | |
| 3,364,536 A | 1/1968 | Williams | |
| 4,115,977 A * | 9/1978 | Bertsch | 52/741.12 |
| 4,135,342 A * | 1/1979 | Cotter | 52/461 |
| 4,177,543 A * | 12/1979 | Angermann | 27/35 |
| 4,237,590 A | 12/1980 | Work | |
| 4,337,556 A | 7/1982 | Winburn et al. | |
| 4,800,631 A * | 1/1989 | Pellmann | 27/7 |
| 5,121,529 A | 6/1992 | McClure | |
| 5,448,810 A * | 9/1995 | Mackirdy | 27/6 |
| 5,526,616 A | 6/1996 | Bamberg | |
| 5,870,862 A | 2/1999 | Gordon | |
| 5,960,524 A | 10/1999 | Darby et al. | |
| 6,324,793 B1 | 12/2001 | Klanke | |
| 6,345,422 B1 | 2/2002 | Darby | |
| 6,453,626 B1 | 9/2002 | Weilein et al. | |
| 6,745,442 B2 * | 6/2004 | Biondo et al. | 27/6 |
| 6,901,640 B2 * | 6/2005 | Sevey | 27/35 |

* cited by examiner

*Primary Examiner* — Eileen D Lillis
*Assistant Examiner* — Chi Nguyen

(57) ABSTRACT

A burial vault base assembly. The assembly includes a front piece, back piece, and first and second side pieces that are connected to one another at a plurality of joints using C-shaped connectors. These pieces form an exterior shell around an interior piece wherein concrete is poured therebetween to form a burial vault base wherein the C-shaped connectors prevent the concrete from breaking at the joints and protruding at the joints.

7 Claims, 3 Drawing Sheets

MULTI PIECE BURIAL VAULT BASE AND METHOD OF MAKING THE SAME

BACKGROUND OF THE INVENTION

This invention relates to burial vaults. More specifically, this invention relates to a burial vault base and method of making the same.

In order to form present burial vaults typically an inner plastic liner is combined with eight exterior pieces to form an outer shell. This shell is created by joining the eight exterior pieces together using double sided foam tape and/or masking tape and joining this exterior to the inner base liner with masking tape. At this time the shell is filled with concrete through an opening in the bottom in order to form the burial vault base.

While the above described burial vault base and method of making the same produces a burial vault base many problems remain. Specifically, the eight exterior pieces are cumbersome to work with and time consuming to produce. Additionally, an excessive amount of masking tape must be used in order to tape all of the individual pieces together. Also, there is a limited mechanism by which concrete is prevented from compromising the plastic or taped joints. This becomes especially important when considering the nature of concrete during the cure process. There is both the risk of a broken joint as well as concrete protruding through the joints.

Therefore, a principal object of the present invention is to provide a burial vault base assembly that is simple to manufacture and assemble.

Yet another object of the present invention is to provide a burial vault base assembly that will prevent concrete from protruding through joints and breaking at joints.

Yet another object of the present invention is to provide a method of making a burial vault base that can be done quickly and efficiently.

These and other objects, features, or advantages of the present invention will become apparent from the specification and claims.

BRIEF SUMMARY OF THE INVENTION

A burial vault base assembly and method of making the same. The burial vault base assembly comprises five independent pieces; specifically a front piece, a back piece, first and second side pieces, and an interior piece. J-shaped connecting members are attached to the front piece, back piece and first and second side pieces. Thus, a plurality of C-shaped connectors can be slid down adjacent J-shaped connecting members on different pieces to connect together the front piece, back piece and first and second side pieces in order to form an exterior shell. The inner piece is then placed in a spaced relation to this exterior shell and concrete is poured in between in order to form the burial vault base.

DETAILED DESCRIPTION OF THE PREFERRED EMBODIMENT

Figure 1:
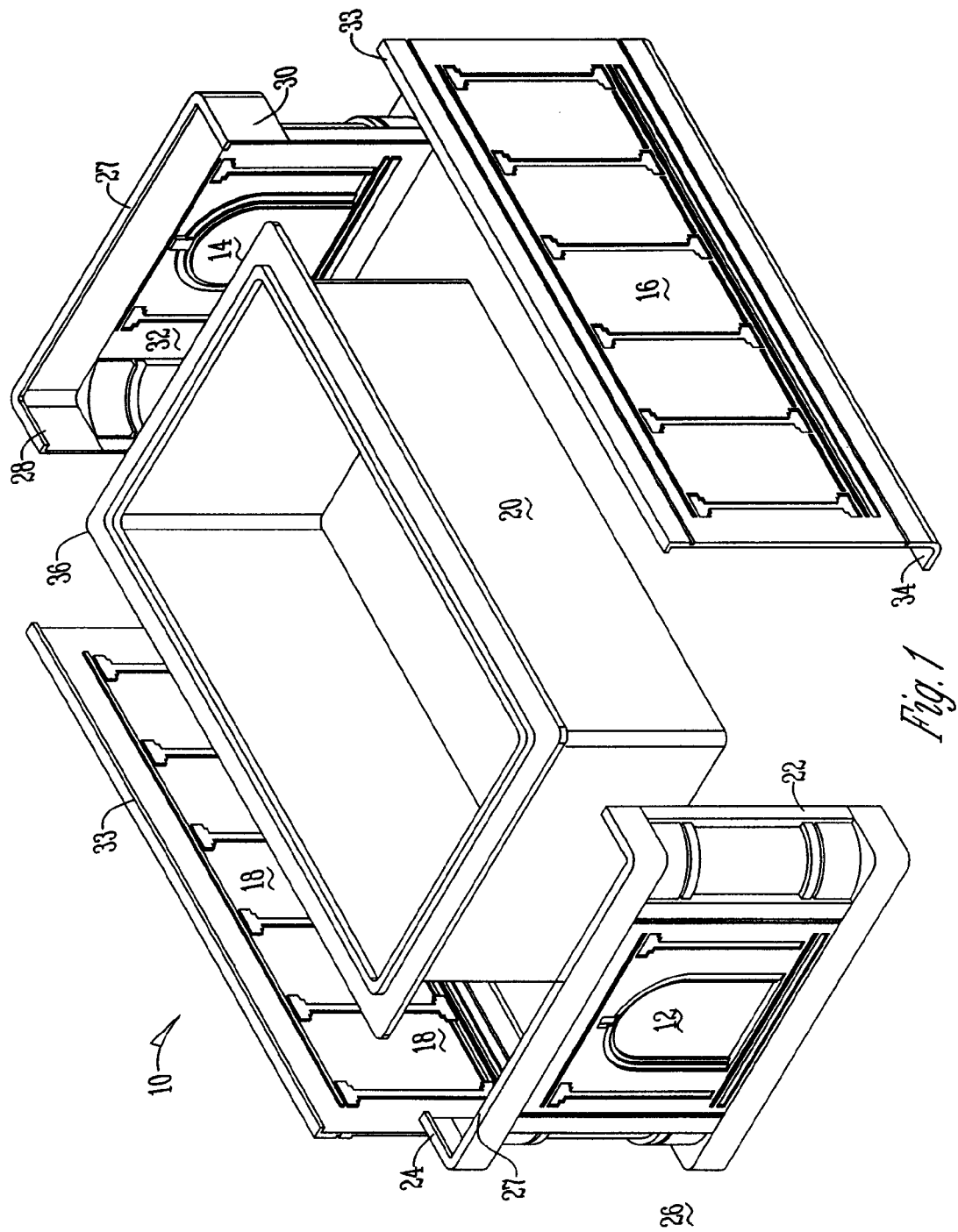
FIG. 1 is a perspective view of a burial vault base assembly.

FIG. 1 shows a perspective view of a burial vault base assembly 10. The burial vault base assembly 10 consists of five interconnecting pieces that includes a front piece 12, a back piece 14, and first and second side pieces 16 and 18 that surround an interior piece 20.

In the embodiment shown in FIG. 1 the front piece 12 has a decorative design and is C-shaped. The C-shape includes first and second flanges 22 and 24 extending from side wall 26. The first and second flanges each have upper flange members 27 extending therefrom. Similarly, the back piece 14 has first and second flanges 28 and 30 extending from side wall 32 wherein the first and second flanges 28 and 30 have upper flange members 27 extending therefrom. Preferably the back piece 14 is also C-shaped.

First and second side pieces 16 and 18 in a preferred embodiment have elongated side faces with upper and lower flange members 33 and 34 extending therefrom. Meanwhile, the interior piece 20 in a preferred embodiment is rectangularly shaped and has an upper flange 36.

Figure 2:
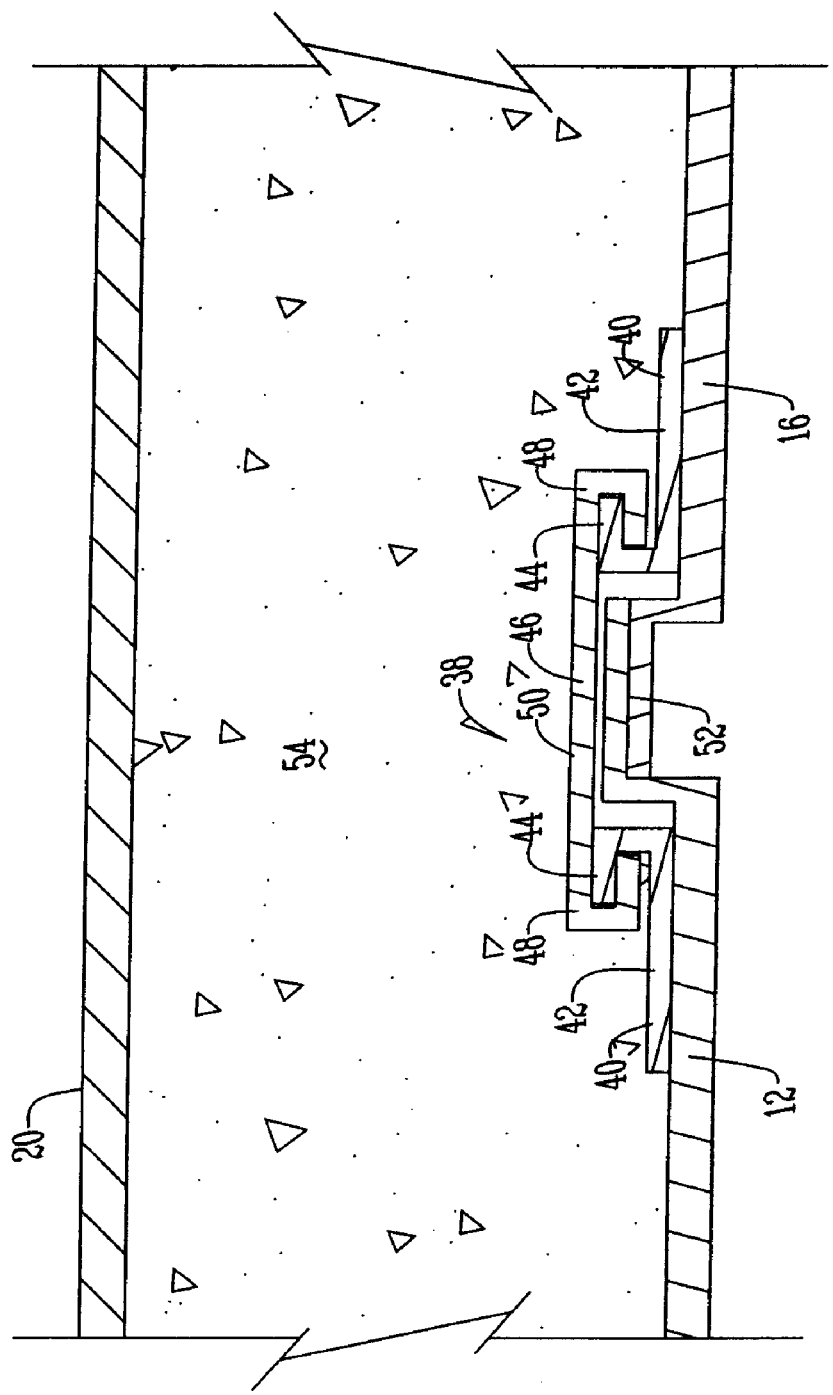
FIG. 2 is a top plan view of a joint of a burial vault base assembly.
Figure 3:
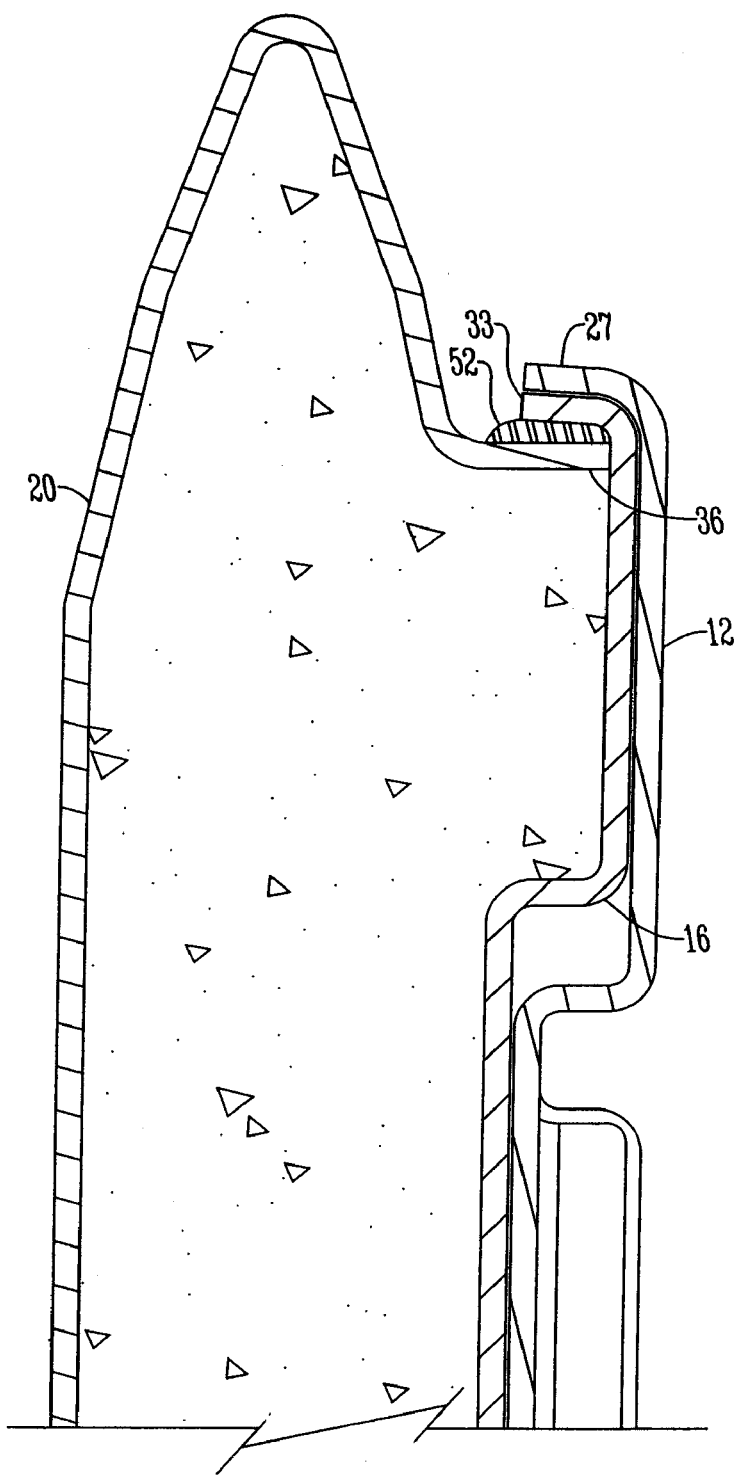
FIG. 3 is a cut away side plan view of a burial vault base assembly.

As best shown in FIGS. 2 and 3 the front piece 12 and back piece 14 connect with the first and second side pieces 16 and 18 at joint 38. When joined the upper flange 36 of the interior piece 20 slides under the upper flange 33 of the first side piece 16 and the upper flange 27 of the front piece overlaps the upper flange 27 of the first side piece. The arrangement provides an aesthetically pleasing exterior At each joint a J-shaped connecting member 40 is secured to a respective piece. Each J-shaped member has an elongated body 42 that extends into a U-shaped channel 44. For example only, in the embodiment shown in FIG. 2 a J-shaped connecting member 40 is affixed to the flange 22 of front piece 12 while another J-shaped connecting member 40 is secured to the first side piece 16. In a preferred embodiment the J-shaped connecting members are secured to the pieces 12 and 16 by being permanently glued thereto. Alternatively, the J-shaped member may be part of the piece 12 or 16 itself.

A C-shaped connector 46 connects the J-shaped connecting members 40. Specifically, the C-shaped connector has oppositely opposed U-shaped channels 48 with a main body 50 disposed therebetween. In order to connect the J-shaped connecting members 40 the opposing U-shaped channels 48 of the C-shaped member interlocks with the U-shaped channels 48 of the J-shaped connecting members and slides therein to form a connection at a joint 38. Once connected caulk 52 is dispersed within the joint 38 in order to bond together the front piece 12 and first piece 16. When the caulk 52 is dispersed within the joint 38 a flexible caulk joint is formed that acts as a sealant at the joint 38.

The front piece 12 and first side piece 16 are preferably made of ABS plastics wherein the caulk 52 effectively bonds the plastic together to enhance the strength of the connection between the pieces 12 and 16. The caulk 52 simultaneously forms a seal at the intersection of the pieces 12 and 16. Once all of the pieces 12, 14, 16 and 18 are connected together via the J-shaped connecting members 40 and C-shaped connectors 46 and exterior shell is formed. At this point in time concrete 54 is poured in between the exterior shell and the inner piece 20 to form the burial vault base.

In operation, the exterior pieces 12, 14, 16 and 18 are placed around the interior piece 20. Once the J-shaped connecting members 40 are adjacent one another the C-shaped connector 46 is slid within the J-shaped connecting member 40 to connect the pieces 12, 14, 16 and 18 to one another.

A first C-shaped connector 46 connects a first J-shaped connecting member 40 of the first side piece 16 with a first J-shaped connecting member 40 of the front piece 12. Meanwhile, a second C-shaped connector 46 connects a first J-shaped connecting member 40 of the second side piece 18 with a second J-shaped connecting member 40 of the front piece 12. A third C-shaped connector 46 connects a second J-shaped connecting member 40 of the first side piece 16 with a first J-shaped connecting member 40 of the back piece 14. A fourth C-shaped connector 46 connects a second J-shaped connecting member 40 of the second side piece 18 with a second J-shaped connecting member 40 of the back piece 14 thus creating an exterior rectangular shell that stands in spaced relation to the interior piece 20.

Once the exterior outer shell is connected the front and back pieces 12 and 14 are bonded to the first and second side pieces 16 and 18 at joints 38 with caulk 52. At this time concrete is poured between the interior piece 20 and the exterior shell. After the concrete cures the burial vault base is formed.

Thus, disclosed is an improved burial vault base assembly 10 and method of making a burial vault base using the same. The burial vault base assembly eliminates unneeded pieces and thus is quick and easy to assemble. Additionally, by using the J-shaped connection members 40 in combination with the C-shaped connectors 46 quick and strong connections are formed at the joints 38 between the pieces 12, 14, 16 and 18. In addition, in a preferred embodiment, the joints 38 can be further strengthened by using caulking to bond the front and back pieces 12 and 14 to the first and second side pieces 16 and 18. As a result of the strengthened joints 38, masking tape no longer needs to be used in order to provide a connection between pieces. Additionally, the strengthened joint minimizes the risk of broken joints as well as concrete protruding through joints. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A burial vault base assembly comprising:
    a C-shaped front piece having first and second flanges extending from a side wall wherein the first and second flanges have first and second J-shaped connecting members secured thereto;
    a first side piece having first and second J-shaped connecting members secured thereto;
    a second side piece having first and second J-shaped connecting members secured thereto;
    a C-shaped back piece having first and second flanges extending from a side wall wherein the first and second flanges have first and second J-shaped connecting members secured thereto;
    a first C-shaped connector having opposing U-shaped channels connecting the first J-shaped connecting member of the first side piece with the first J-shaped connecting member of the first flange of the front piece;
    a second C-shaped connector having opposing U-shaped channels connecting the first J-shaped connecting member of the second side piece with the second J-shaped connecting member of the second flange of the front piece;
    a third C-shaped connector having opposing U-shaped channels connecting the second J-shaped connecting member of the first side piece with the first J-shaped connecting member of the first flange of the back piece;
    a fourth C-shaped connector having opposing U-shaped channels connecting the second J-shaped connecting member of the second side piece with the second J-shaped connecting member of the second flange of the back piece;
    an interior piece in spaced relation to the front piece, first and second side pieces and the back piece;
    wherein concrete is disposed between the interior piece and the front piece, first and second side pieces and the back piece to form a burial vault base; and
    wherein the opposing U-shaped channels of the C-shaped connectors interlock with the U-shaped channels of the J-shaped connecting members to form joints to connect the C-shaped front piece, the first side piece, the second side piece, and the C-shaped back piece to form an exterior shell of a burial vault base having interconnecting pieces.

2. The burial vault base assembly of claim 1 wherein caulk is provided to bond the front piece and first side piece.

3. The burial vault base assembly of claim 1 wherein the front piece, the first and second side pieces and the back piece are lined with thermo plastic.

4. The burial vault base assembly of claim 1 wherein the interior piece is rectangular shaped.

5. A method of making a burial vault base, steps comprising:
    providing a C-shaped front piece, C-shaped back piece and first and second side pieces wherein the C-shaped front piece has first and second flanges extending from a side wall and the C-shaped back piece has first and second flanges extending from a side wall;
    securing J-shaped connecting members to the first and second side pieces and the first and second flanges of the front piece and the first and second flanges of the back piece;
    connecting a first J-shaped connecting member of the the first flange of the front piece to a first J-shaped connecting member of the first side piece with a first C-shape connector to form a first joint;
    connecting a second J-shaped connecting member of the second flange of the front piece with a first J-shaped connecting member of the second side piece with a second C-shaped connector to form a second joint;
    connecting a first J-shaped connecting member of the the first flange of the back piece with a second J-shaped connecting member on the first side piece with a third C-shaped connector;
    connecting a second J-shaped connecting member of the the second flange of the back piece with a second J-shaped connecting member on the second side piece with a fourth C-shaped connector;
    placing an interior piece in spaced relation to the front piece, back piece and first and second side pieces;
    pouring concrete between the interior piece and the front piece, back piece and first and second side pieces to form a burial vault base; and
    wherein the opposing U-shaped channels of the C-shaped connectors interlock with the U-shaped channels of the J-shaped connecting members to connect the C-shaped front piece, the first side piece, the second side piece, and the C-shaped back piece to form an exterior shell of a burial vault base having interconnecting pieces.

6. The method of claim 5 further comprising the step of bonding the front piece to the first side piece with caulk at the first joint.

7. The method of claim 5 wherein the front piece is lined with thermo plastic.

* * * * *